(12) United States Patent
Foser et al.

(10) Patent No.: US 11,525,308 B2
(45) Date of Patent: Dec. 13, 2022

(54) DRILLING DEVICE

(71) Applicant: Hilti Aktiengesellschaft, Schaan (LI)

(72) Inventors: Roland Foser, Ruggell (LI); Pierre Pallmer, Igling (DE); Jens Kondratiuk, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 6 days.

(21) Appl. No.: 16/972,978

(22) PCT Filed: May 28, 2019

(86) PCT No.: PCT/EP2019/063792
§ 371 (c)(1),
(2) Date: Dec. 7, 2020

(87) PCT Pub. No.: WO2019/238411
PCT Pub. Date: Dec. 19, 2019

(65) Prior Publication Data
US 2021/0252612 A1     Aug. 19, 2021

(30) Foreign Application Priority Data
Jun. 11, 2018  (EP) .................................. 18176911

(51) Int. Cl.
  *E21B 10/44*  (2006.01)
  *B23B 51/02*  (2006.01)
(52) U.S. Cl.
  CPC ............ *E21B 10/445* (2013.01); *B23B 51/02* (2013.01)

(58) Field of Classification Search
  CPC ....... B23B 51/02; E21B 10/445; E21B 17/22; E21B 10/44
  See application file for complete search history.

(56) References Cited

U.S. PATENT DOCUMENTS

| | | |
|---|---|---|
| 137,744 A | 4/1873 | West |
| 1,939,080 A | 12/1933 | Pickard |
| 4,091,693 A | 5/1978 | Straub |
| 4,852,670 A | 8/1989 | Peetz et al. |
| 5,135,378 A | 8/1992 | Catton |
| 5,403,130 A | 4/1995 | Moser et al. |
| 5,573,660 A | 11/1996 | Eicker et al. |
| 7,946,355 B1 * | 5/2011 | Kluge .................. A01K 97/01 175/323 |

(Continued)

FOREIGN PATENT DOCUMENTS

| | | |
|---|---|---|
| CH | 588 987 A5 | 6/1977 |
| DE | 745856 C | 5/1944 |

(Continued)

OTHER PUBLICATIONS

English Translation of EP-0347601-A1 (Year: 1989).*
PCT/EP2019/063792, International Search Report dated Jul. 10, 2019 (Three (3) pages).

Primary Examiner — Eric A. Gates
Assistant Examiner — Paul M Janeski
(74) Attorney, Agent, or Firm — Crowell & Moring LLP

(57) ABSTRACT

A drilling device includes a drill basic body and a conveying helix which runs helically around the drill basic body. The conveying helix is subdivided into a plurality of conveying helix segments that are disposed next to one another. The conveying helix segments may be disposed loosely next to one another.

12 Claims, 4 Drawing Sheets

(56) References Cited

U.S. PATENT DOCUMENTS

| | | | |
|---|---|---|---|
| 9,127,506 B2 | | 9/2015 | Stimpfle-Ziegler |
| 2017/0298695 A1 | * | 10/2017 | Kluge .................. E21B 10/633 |

FOREIGN PATENT DOCUMENTS

| | | | |
|---|---|---|---|
| DE | 2543578 C2 | | 4/1977 |
| DE | 34 05 070 A1 | | 8/1985 |
| DE | 36 14 010 A1 | | 11/1987 |
| DE | 0347601 A1 | * | 12/1989 |
| DE | 44 01 914 A1 | | 7/1995 |
| EP | 0 201 724 A2 | | 11/1986 |
| EP | 0 264 657 A1 | | 4/1988 |
| EP | 0 595 214 A2 | | 5/1994 |
| EP | 2 003 270 A2 | | 12/2008 |
| EP | 2 487 320 A1 | | 8/2012 |
| SU | 135453 A1 | | 11/1960 |

* cited by examiner

DRILLING DEVICE

CROSS REFERENCE TO RELATED APPLICATIONS

This application claims the priority of International Application No. PCT/EP2019/063792, filed May 28, 2019, and European Patent Document No. 18176911.8, filed Jun. 11, 2018, the disclosures of which are expressly incorporated by reference herein.

BACKGROUND AND SUMMARY OF THE INVENTION

The present invention relates to a drilling device, in particular a core drill.

So-called core drills can comprise a drill basic body having a drilling head, and a steel conveying helix which runs around a shaft of the drill basic body. The steel conveying helix can be plugged onto the drill basic body and be fixedly or releasably connected thereto. It is possible by means of the steel conveying helix for drillings, for example masonry dust, to be transported away from the drilling head.

DE 34 05 070 A1 discloses a masonry drill having a drilling head with integrally formed shaft. From the drilling head, the shaft is surrounded at a radial distance by a tube over a large part of its length, the tube bearing a conveying helix seated on the outer side thereof.

EP 0 201 724 A2 discloses an interchangeable conveying helix which serves for masonry drills to convey drillings. In order to produce the interchangeable conveying helix, use is made of a T-profile jet whose helically wound transverse web forms the casing tube and whose perpendicular web forms the transport shoulder.

An object of the present invention is to provide an improved drilling device.

Accordingly, a drilling device, in particular a core drill, is provided. The drilling device comprises a drill basic body and a conveying helix which runs helically around the drill basic body, wherein the conveying helix is subdivided into a plurality of conveying helix segments arranged next to one another.

The fact that the conveying helix is subdivided into the conveying helix segments means that simple and rapid replacement of individual conveying helix segments, for example as a result of wear, is possible without a cost-intensive complete replacement of the conveying helix. Furthermore, simple and rapid mounting and demounting of the drilling device is possible.

The drilling device is suitable in particular for use with a handheld power tool. The handheld power tool can be for example a drilling machine, a percussive drilling machine, a rotary hammer, a cordless screwdriver, a chisel hammer or the like. The handheld power tool preferably comprises a motor for setting the drilling device in rotation. The handheld power tool preferably furthermore comprises a fastening device which is designed to fasten the drilling device to the handheld power tool. The fastening device is, for example, a drill chuck.

The drilling device is preferably a core drill, a hammer drill, a masonry drill or the like or can be referred to as such. The drill basic body can also be referred to as a drill blank. The drill basic body preferably comprises a drilling head with cutting bodies and with a center drill and also comprises a shank, by means of which the drilling device can be coupled to the handheld power tool. Between the shank and the drilling head, there is provided a shaft onto which the conveying helix segments are in particular threaded. The conveying helix can also be referred to as a conveying screw or conveying spiral. Furthermore, the conveying helix can also be referred to merely as a helix, screw or spiral. The term "helical" can also be replaced by the term "screw-shaped" or "spiral".

What is to be understood by the fact that the conveying helix is "subdivided" into the conveying helix segments is that the conveying helix segments are separate components which are not connected to one another. That is to say that the conveying helix segments can be replaced individually or else together. It is possible here for a sequence of the conveying helix segments on the drill basic body to be changed. What is to be understood by the fact that the conveying helix segments are arranged "next to one another" is that, as viewed in a longitudinal direction of the drilling device, the conveying helix segments are arranged in such a way that at least two conveying helix segments are positioned next to one another or adjacently. However, the number of conveying helix segments is arbitrary. Preferably, however, at least two such conveying helix segments are provided. However, it is also possible for three, four, five, six, seven or more conveying helix segments to be provided.

According to one embodiment, the conveying helix segments are arranged loosely next to one another.

In particular, the conveying helix segments are not connected to one another. The conveying helix segments are therefore preferably arranged next to one another in a connection-free or connectionless manner. That is to say that the conveying helix segments can be separated from one another without tools.

According to a further embodiment, the conveying helix is manufactured from a plastics material.

The conveying helix can also be referred to as a plastic conveying helix. In particular, the individual conveying helix segments are manufactured from a plastics material. Accordingly, the conveying helix segments can be referred to as plastic conveying helix segments. For example, the conveying helix segments can be cost-effective plastic injection-molded components. The plastics material can be, for example, polypropylene (PP), polyethylene (PE), polytetrafluoroethylene (PTFE) or another suitable plastics material. The plastics material is preferably a thermoplastic. The fact that the conveying helix or the conveying helix segments is/are preferably manufactured from a plastics material means that, by comparison with a drilling device having a conveying helix made of a metal material, a significant reduction in noise pollution can be achieved. Furthermore, as a result of using the plastics material, a significant weight reduction of the drilling device can be achieved by comparison with a drilling device having a metallic conveying helix as mentioned above. In addition, heating of the shank is reduced on account of the reduced thermal conductivity of the plastics material in relation to a metal. This improves the ease of handling of the drilling device. Alternatively, the conveying helix can also be manufactured from another suitable material, such as, for example, from a composite material. It is also possible for the conveying helix to contain a metal material and/or a ceramic material or to be manufactured from such a material.

According to a further embodiment, the conveying helix segments are connected to the drill basic body in a form-fitting manner.

In particular, the conveying helix segments are connected to the drill basic body in a rotationally fixed manner. That is to say that the conveying helix segments cannot be rotated about a center axis or axis of symmetry of the drilling device, but are displaced along the longitudinal direction of the drilling device. A form-fitting connection occurs as a result of at least two connection partners, in this case the conveying helix segments and the drill basic body, engaging in one another or behind one another.

According to a further embodiment, the drill basic body has an engagement portion, in particular an outer hexagon, and the conveying helix segments each have a mating engagement portion, in particular an inner hexagon, which engages in the engagement portion in a form-fitting manner.

As an alternative to the outer hexagon and the inner hexagon, it is also possible to provide any desired outer polygon and inner polygon, for example an outer triangle or outer square and accordingly an inner triangle or inner square. Alternatively, it is also possible to provide, between the drill basic body and the conveying helix segments, in each case a toothing as engagement portion and a corresponding mating toothing as mating engagement portion.

According to a further embodiment, each conveying helix segment has a base portion, through which the drill basic body is guided, and a conveying helix portion running helically around the base portion.

The conveying helix portions preferably form an outer surface or outer edge of the conveying helix which in particular defines an envelope of the conveying helix. The envelope is preferably cylindrical. The outer edge runs spirally around the axis of symmetry.

According to a further embodiment, the base portion is hollow cylindrical and has two end sides oriented perpendicularly to an axis of symmetry of the drilling device.

The end sides or end faces each form in particular a base of the hollow cylindrical geometry of the base portion. The base portion is plugged or threaded onto the drill basic body, in particular onto the shaft thereof.

According to a further embodiment, the base portion and the conveying helix portion are formed in one piece, in particular in a materially integral manner.

What is to be understood by "in one piece" is in particular that the base portion and the conveying helix portion form a common component. What is to be understood by "in a materially integral manner" is in particular that the base portion and the conveying helix portion form a one-piece component which is manufactured from the same material throughout. The conveying helix segments therefore preferably take the form of cost-effective plastic injection-molded components.

According to a further embodiment, a pitch of the conveying helix is selected in such a way that the conveying helix portion runs once around the base portion.

Alternatively, the pitch of the conveying helix can also be selected in such a way that the conveying helix portion runs a number of times around the base portion.

According to a further embodiment, the conveying helix segments each have a metal insert part situated externally with respect to a radial direction of the drilling device.

The radial direction is oriented perpendicularly to the axis of symmetry and points away therefrom. In particular, the metal insert part defines the aforementioned envelope which envelops the conveying helix. That is to say that, as viewed in the radial direction, the metal insert parts of the conveying helix form the aforementioned outer edge of the conveying helix. The metal insert parts prevent premature wear of the conveying helix. The metal insert parts are provided in particular on the respective conveying helix portions of the conveying helix segments.

According to a further embodiment, metal insert parts of adjacent conveying helix segments are out of contact.

This allows noise formation due to contact of metal insert parts of adjacent conveying helix segments to be reliably prevented. As a result, the outer edge of the conveying helix is in particular not continuous, but interrupted.

According to a further embodiment, the metal insert part is at least partially overmolded with material of the respective conveying helix segment.

That is to say that the metal insert part is connected to the respective conveying helix segment in an integrally bonded manner. In the case of integrally bonded connections, the connection partners are held together by atomic or molecular forces. Integrally bonded connections are nonreleasable connections which can be separated only by destroying the connection means and/or the connection partners. The metal insert part is preferably overmolded with the material of the respective conveying helix segment in a plastic injection-molding method. Particularly cost-effective production of the conveying helix segments is possible in this way. Furthermore, particularly high durability of the connection between the metal insert part and the conveying helix segment is ensured.

According to a further embodiment, the drilling device comprises an elastomer ring for arresting the conveying helix segments on the drill basic body.

The elastomer ring can be manufactured, for example, from rubber, a thermoplastic polyurethane or the like. The elastomer ring can be suitable for spring-preloading the conveying helix segments as viewed in the longitudinal direction of the drilling device. A relative movement between the conveying helix segments can be reliably prevented in this way. This prevents undesired wear.

According to a further embodiment, the conveying helix segments are arranged between the elastomer ring and a drilling head of the drill basic body.

As mentioned above, the conveying helix segments are threaded onto the shaft of the drill basic body, with the conveying helix segments bearing against the drilling head on one side and against the elastomer ring on one side.

According to a further embodiment, the elastomer ring bears against a shoulder which runs around the drill basic body.

Alternatively, a spacing or gap can also be provided between the shoulder and the elastomer ring, with the result that the elastomer ring bears against the shoulder only when a force is applied to the conveying helix as viewed in the longitudinal direction.

Also provided is a handheld power tool having such a drilling device.

The following description explains the invention with reference to exemplary embodiments and Figures.

DETAILED DESCRIPTION OF THE DRAWINGS

Identical or functionally identical elements are indicated by the same reference signs in the Figures, unless stated otherwise.

Figure 1:
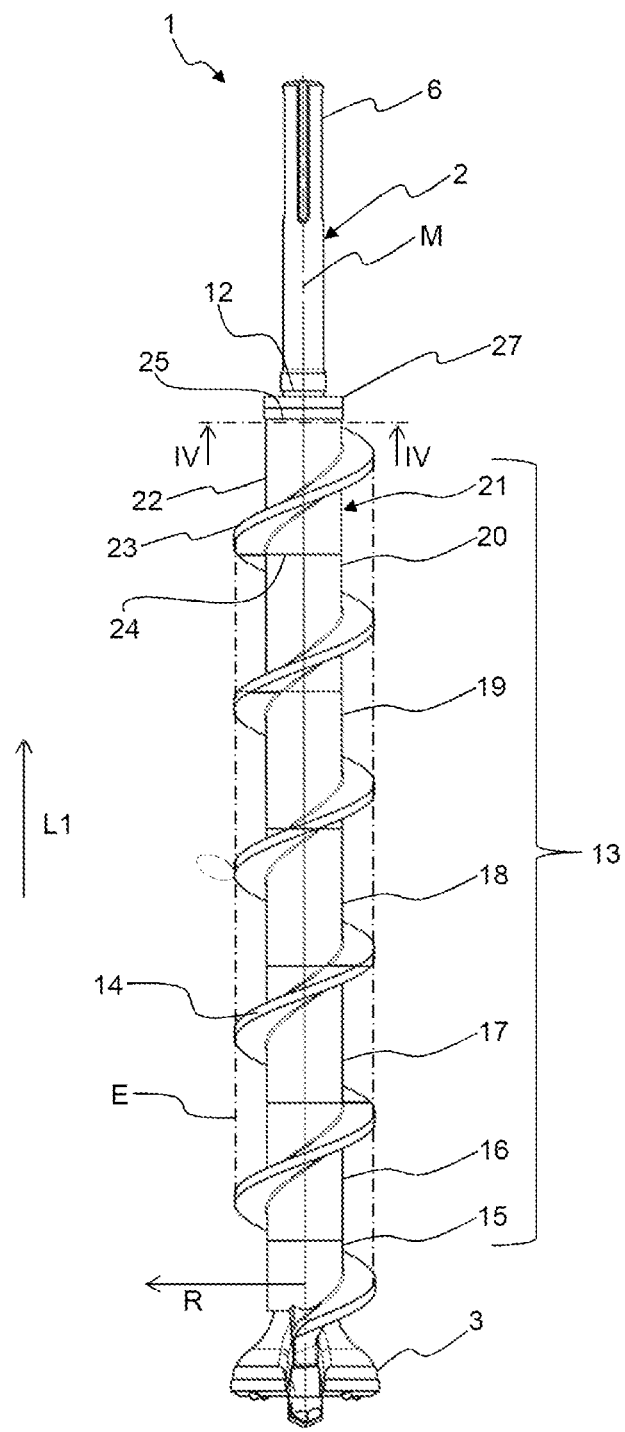
FIG. 1 shows a schematic view of one embodiment of a drilling device.

FIG. 1 shows a schematic view of one embodiment of a drilling device 1. The drilling device 1 is a core drill, masonry drill or hammer drill or can be referred to as such. The drilling device 1 comprises a drill basic body 2 shown in FIGS. 2 and 3. The drill basic body 2 can also be referred to as a drill shaft or drill blank. The drill basic body 2 is manufactured from metal, for example from a steel alloy.

The drill basic body 2 comprises a drilling head 3 with cutting bodies 4. The cutting bodies 4 can comprise, for example, a hard metal or a ceramic material. A material to be machined, for example masonry or concrete, can be abrasively removed by means of the cutting bodies 4. The cutting bodies 4 can, for example, be brazed to the drilling head 3. Furthermore, the drilling head 3 comprises a center drill 5 which projects beyond the latter in a longitudinal direction L2 of the drill basic body 2. The center drill 5 can also comprise a hard metal or a ceramic material.

The drill basic body 2 further comprises a shank 6, by means of which the drilling device 1 can be releasably connected to a handheld power tool. The handheld power tool can be, for example, a rotary hammer, a chisel hammer, a core drill or the like. The shank 6 comprises a plurality of driving slots 7 which serve for a form-fitting engagement of locking elements of the handheld power tool. A form-fitting connection occurs as a result of at least two connection partners, in this case the driving slots 7 and the locking elements, engaging in one another or behind one another.

Figure 3:
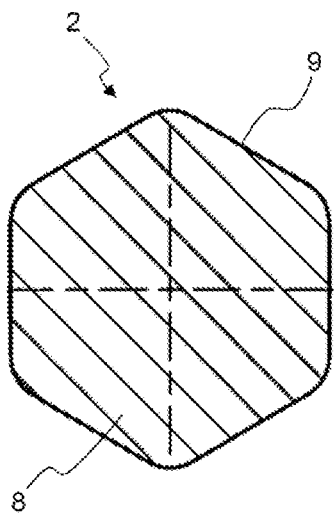
FIG. 3 shows a schematic sectional view of the drill basic body along the section line III-III of FIG. 2.

A shaft 8 of the drill basic body 2 extends in the longitudinal direction L2 between the drilling head 3 and the shank 6. The shaft 8 comprises an engagement portion 9. The engagement portion 9 can be an outer polygon, in particular an outer hexagon (FIG. 3). The engagement portion 9 is connected to the drilling head 3 by means of a transition region 10 which is preferably circular in cross section.

Between the shank 6 and the engagement portion 9, there is provided an engagement region 11 which is preferably circular in cross section and which is delimited from the shank 6 by a peripheral shoulder 12. The engagement portion 9, the transition region 10 and the engagement region 11 are part of the shaft 8. The drill basic body 2 is designed to be substantially rotationally symmetrical to a center axis or axis of symmetry M. The longitudinal direction L2 runs parallel to the axis of symmetry M or corresponds thereto.

Returning now to FIG. 1, the drilling device 1 comprises, in addition to the drill basic body 2, a conveying helix 13 which runs spirally, helically or in the form of a screw around the drill basic body 2. The conveying helix 13 is suitable, in a longitudinal direction L1 of the drilling device 1, to convey drillings, for example masonry dust, away from the drilling head 3 in the direction of the shank 6 of the drill basic body 2. The longitudinal direction L1 here corresponds to the longitudinal direction L2. The longitudinal directions L1, L2 are oriented here from bottom up in the orientation of FIGS. 1 and 2, that is to say from the drilling head 3 in the direction of the shank 6. The drilling device 1 is also designed to be substantially rotationally symmetrical to the axis of symmetry M. The conveying helix 13 can also be referred to as a conveying spiral or conveying screw.

The conveying helix 13 is assigned an envelope E. The envelope E is cylindrical with a circular base. The envelope E is defined by an outer surface or outer edge 14 of the conveying helix 13 that is arranged spaced apart from the axis of symmetry M in a radial direction R and runs spirally around the axis of symmetry M. Here, the radial direction R is oriented perpendicularly to and away from the axis of symmetry M.

The conveying helix 13 is subdivided into a plurality of conveying helix segments 15 to 21 arranged next to one another. The number of conveying helix segments 15 to 21 is arbitrary. In particular, however, at least two such conveying helix segments 15 to 21 are provided. FIG. 1 shows seven conveying helix segments 15 to 21 which are threaded onto the shaft 8 of the drill basic body 2. The conveying helix segments 15 to 21 are arranged loosely next to one another. That is to say that the conveying helix segments 15 to 21 are not connected to one another and take the form of separate components. This allows the replacement of individual conveying helix segments 15 to 21. As viewed in the longitudinal direction L1, the conveying helix segments 15 to 21 can have different lengths or equal lengths.

The conveying helix, and in particular the individual conveying helix segments 15 to 21, is/are preferably manufactured from a plastics material. For example, the conveying helix segments 15 to 21 can be manufactured from polyethylene (PE), polypropylene (PP), polytetrafluoroethylene (PTFE) or any other suitable plastics material. The plastics material is in particular a thermoplastic. For example, the conveying helix segments 15 to 21 can be cost-effective plastic injection-molded components. The conveying helix 13 can also be referred to as a plastic conveying helix.

Each conveying helix segment 15 to 21 has, as shown by way of the conveying helix segment 21, a tubular base portion 22, which is plugged onto the drill basic body 2, in particular onto the engagement portion 9 of the shaft 8, and a conveying helix portion 23 which runs helically around the base portion 22. The conveying helix portions 23 of all the conveying helix segments 15 to 21 thus form the conveying helix 13, which runs around the drill basic body 2, with the outer edge 14. The base portions 22 are also part of the conveying helix 13.

The base portion 22 and the conveying helix portion 23 of each conveying helix segment 15 to 21 are preferably formed in one piece, in particular in a materially integral manner. For example, the conveying helix segments 15 to 21 can, as mentioned above, be cost-effective plastic injection-molded components. The base portion 22 is hollow cylindrical and comprises two end faces or end sides 24, 25 which are oriented parallel to one another and perpendicularly to the axis of symmetry M. The end sides 24, 25 are annular and form a base of the hollow cylindrical geometry of the base portion 22.

Here, a pitch, in particular a thread pitch, of the conveying helix 13 is selected in such a way that the respective conveying helix portion 23 of each conveying helix segment 15 to 21 runs once around the base portion 22 assigned to it. Alternatively, the pitch can also be selected in such a way that the conveying helix portion 23 runs a number of times, for example two or three times, around the base portion 22.

Figure 2:
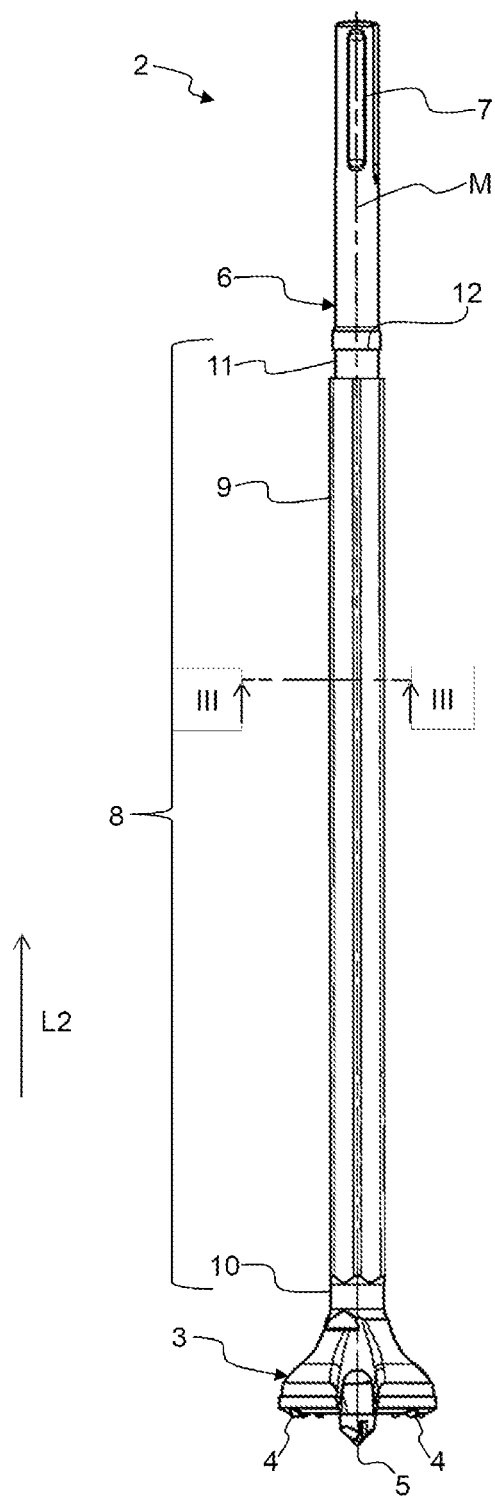
FIG. 2 shows a schematic view of one embodiment of a drill basic body for the drilling device according to FIG. 1.
Figure 4:
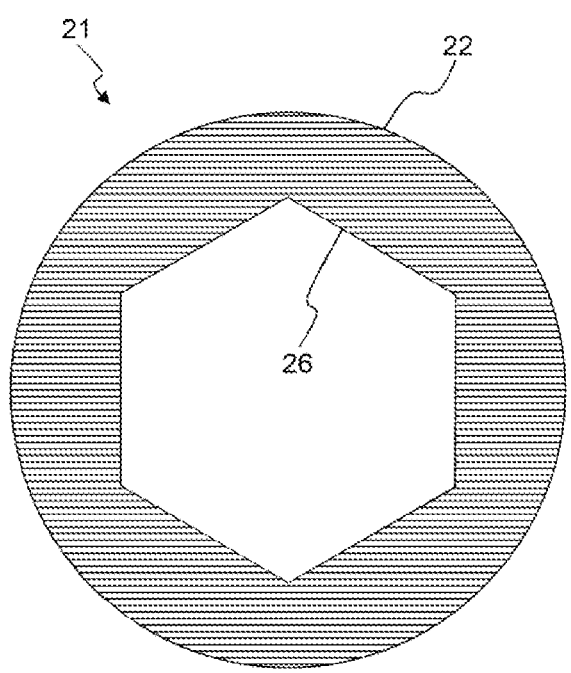
FIG. 4 shows a schematic sectional view of one embodiment of a conveying helix segment for the drilling device along the section line IV-IV of FIG. 1.

As mentioned above, the conveying helix segments 15 to 21 are not connected to one another. However, the conveying helix segments 15 to 21 are connected to the drill basic body 2 in a form-fitting manner in such a way that the conveying helix segments 15 to 21 are secured to the drill basic body 2 in a rotationally fixed manner. As mentioned above, the drill basic body 2 has the engagement portion 9 which is shown in FIGS. 2 and 3. Accordingly, the base portions 22 of the conveying helix segments 15 to 21 have a mating engagement portion 26 (FIG. 4) corresponding to the engagement portion 9. The mating engagement portion 26 can, as shown in FIG. 4, be an inner polygon, in particular an inner hexagon, corresponding to the engagement portion 9.

As shown in FIG. 1, the conveying helix segments 15 to 21 are threaded onto the drill basic body 2 in such a way that a first conveying helix segment 15 bears against the drilling head 3. The first conveying helix segment 15 is followed by a second to seventh conveying helix segment 16 to 21. The seventh conveying helix segment 21 for its part is secured with respect to the shoulder 12 of the drill basic body 2 by means of an elastomer ring 27. Here, the elastomer ring 27 engages in the engagement region 11. As viewed in the longitudinal direction L1, the conveying helix segments 15 to 21 are thus secured axially between the drilling head 3 and the elastomer ring 27. An antirotational safeguard of the conveying shaft segments 15 to 21 is ensured by means of the aforementioned engagement portion 9 and the corresponding mating engagement portion 26.

It is possible after removal of the elastomer ring 27 for the conveying helix segments 15 to 21 to be removed from the drill basic body 2 in a simple manner. The elastomer ring 27 can always bear against the shoulder 12 or only when a force acting in the longitudinal direction L1 is applied to the conveying helix 13. In this case, a gap can be provided between the shoulder 12 and the elastomer ring 27.

Figure 5:
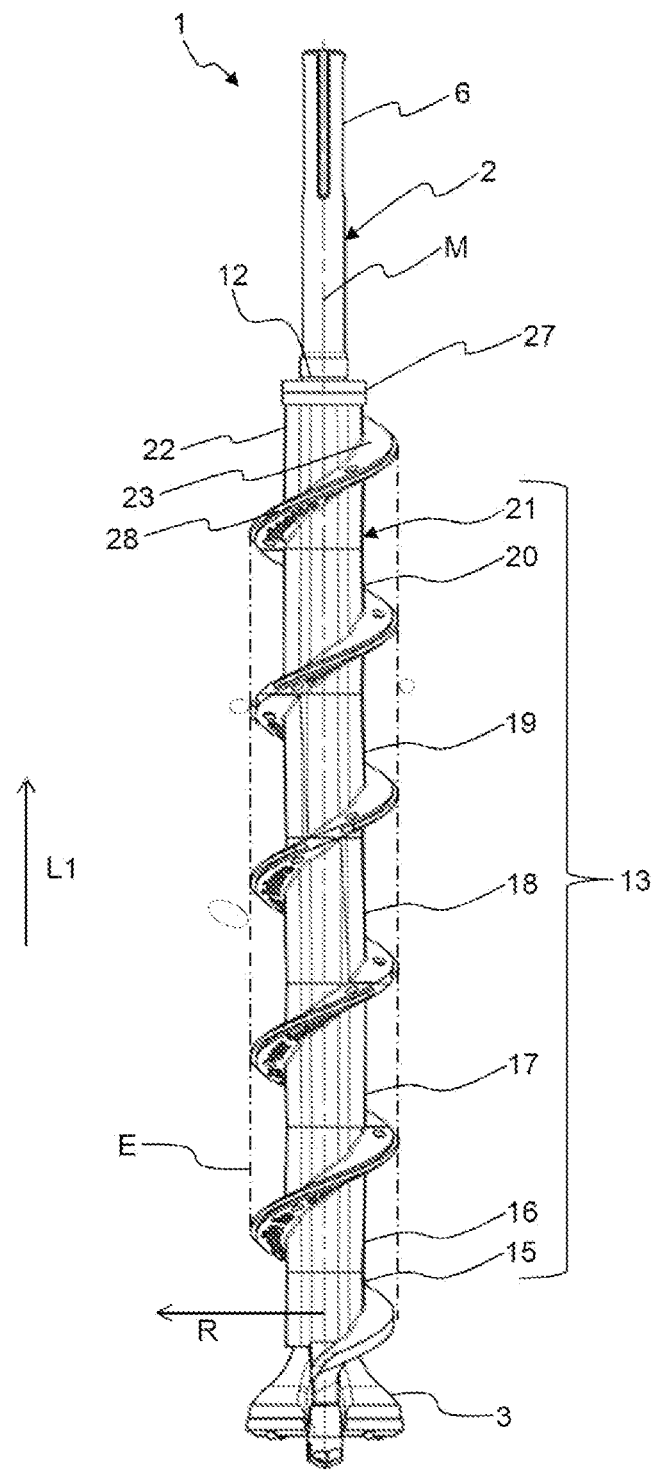
FIG. 5 shows a schematic view of a further embodiment of a drilling device.

FIG. 5 shows a further embodiment of a drilling device 1. The drilling device 1 according to FIG. 5 differs from the drilling device 1 according to FIG. 1 substantially only in that the conveying helix portions 23 of the conveying helix segments 15 to 21 each have a metal strip or metal insert part 28 which points away from the respective base portion 22. The metal insert part 28 takes the form of a steel strip, for example.

As viewed in the radial direction R, the metal insert part 28 is situated in each case on an outermost circumferential edge of the respective conveying helix portion 23 of the conveying helix segments 15 to 21. The aforementioned envelope E is thus defined by the metal insert parts 28 of the conveying helix 13. The outer edge 14, which is not provided with a reference sign in FIG. 5, is formed by means of the metal insert parts 28. Here, metal insert parts 28 of adjacent conveying helix segments 15 to 21, for example of the conveying helix segments 15 and 16, do not contact one another, with the result that the outer edge 14 is not continuous, but interrupted. This makes it possible to avoid noise formation due to contact between adjacent metal insert parts 28. Reduced wear of the conveying helix 13 can be achieved by means of the metal insert parts 28.

Both embodiments of the drilling device 1 which have been explained above have the advantages listed below. The fact that the conveying helix segments 15 to 21 are manufactured from a plastics material means that it is possible, by comparison with a drilling device having a conveying helix made of a metal material, to achieve a significant reduction in noise pollution. Furthermore, as a result of using the plastics material, a weight reduction of the drilling device 1 can be achieved. Heating of the shank 6 is reduced on account of the reduced thermal conductivity of the plastics material in relation to a metal.

The form-fitting engagement of the mating engagement portion 26 in the engagement portion 9 makes it possible for the conveying helix segments 15 to 21 to be locked and mounted in a simple manner. Furthermore, individual conveying shaft segments 15 to 21 can be replaced simply and rapidly, for example upon wear. It is possible by means of the elastomer ring 27 to achieve simple locking of the conveying helix segments 15 to 21 on the drill basic body 2 in the axial direction, that is to say in the longitudinal direction L1.

LIST OF REFERENCE CHARACTERS

1 Drilling device
2 Drill basic body
3 Drilling head
4 Cutting body
5 Center drill
6 Shank
7 Driving slot
8 Shaft
9 Engagement portion
10 Transition region
11 Engagement region
12 Shoulder
13 Conveying helix
14 Outer edge
15 Conveying helix segment
16 Conveying helix segment
17 Conveying helix segment
18 Conveying helix segment
19 Conveying helix segment
20 Conveying helix segment
21 Conveying helix segment
22 Base portion
23 Conveying helix portion
24 End side
25 End side
26 Mating engagement portion
27 Elastomer ring
28 Metal insert part
E Envelope
L1 Longitudinal direction
L2 Longitudinal direction
M Axis of symmetry
R Radial direction

The invention claimed is:

1. A drilling device, comprising:
a drill basic body; and
a conveying helix, wherein the conveying helix runs helically around the drill basic body and wherein the conveying helix is subdivided into a plurality of conveying helix segments disposed next to one another;
wherein the plurality of conveying helix segments are each comprised of a plastics material;
wherein the plurality of conveying helix segments each have a respective metal insert part disposed on a radially outermost circumferential edge of a respective conveying helix portion of the respective conveying helix segment; and
wherein the respective metal insert part is at least partially disposed in the plastics material of the respective conveying helix segment.

2. The drilling device as claimed in claim 1, wherein the plurality of conveying helix segments are disposed next to one another in a connection-free manner.

3. The drilling device as claimed in claim 1, wherein the plurality of conveying helix segments are connected to the drill basic body in a form-fitting manner.

4. The drilling device as claimed in claim 3, wherein the drill basic body has an engagement portion and the plurality of conveying helix segments each have a respective mating engagement portion which engages in the engagement portion in the form-fitting manner.

5. The drilling device as claimed in claim 1, wherein each of the plurality of conveying helix segments has a respective base portion through which the drill basic body is guided and wherein the respective conveying helix portion runs helically around the respective base portion.

6. The drilling device as claimed in claim 5, wherein the respective base portions are hollow and cylindrical and have two end sides that are oriented perpendicularly to an axis of symmetry of the drilling device.

7. The drilling device as claimed in claim 5, wherein the respective base portions and the respective conveying helix portions are formed in one piece.

8. The drilling device as claimed in claim 5, wherein a pitch of the conveying helix is dimensioned such that the respective conveying helix portion runs once helically around the respective base portion.

9. The drilling device as claimed in claim 1, wherein the respective metal insert parts of adjacent ones of the plurality of conveying helix segments do not contact one another.

10. The drilling device as claimed in claim 1 further comprising an elastomer ring, wherein the elastomer ring arrests the plurality of conveying helix segments on the drill basic body.

11. The drilling device as claimed in claim 10, wherein the plurality of conveying helix segments are disposed between the elastomer ring and a drilling head of the drill basic body.

12. The drilling device as claimed in claim 10, wherein the elastomer ring bears against a shoulder that runs around the drill basic body.

* * * * *